S. A. HOLMAN.
PLATE OR PAN LIFTER.
APPLICATION FILED APR. 7, 1909.
937,305.
Patented Oct. 19, 1909.
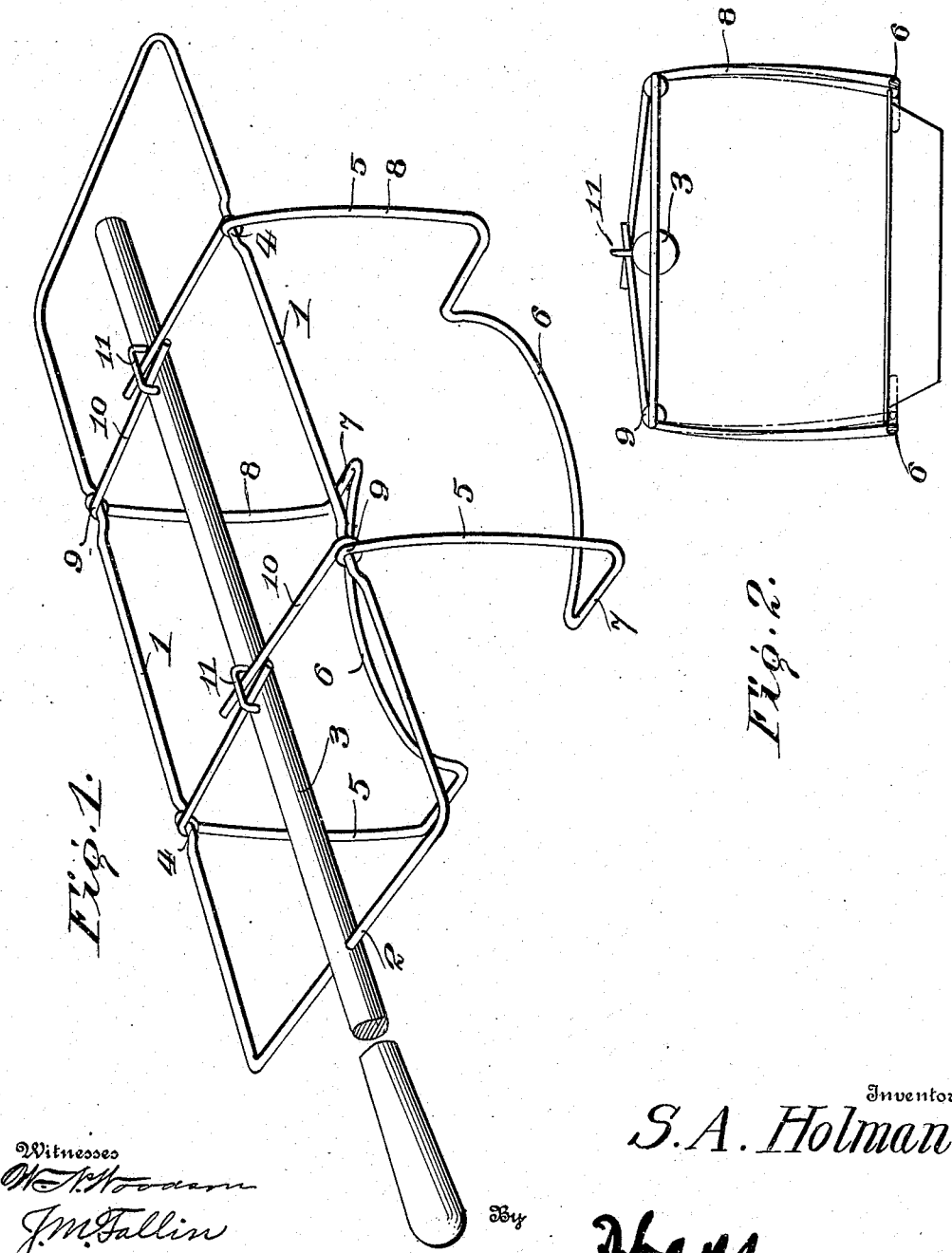
Witnesses
Inventor
S. A. Holman.
By
Attorneys.

UNITED STATES PATENT OFFICE.

STEPHEN A. HOLMAN, OF PENRYN, CALIFORNIA.

PLATE OR PAN LIFTER.

937,305. Specification of Letters Patent. Patented Oct. 19, 1909.

Application filed April 7, 1909. Serial No. 488,461.

*To all whom it may concern:*

Be it known that I, STEPHEN A. HOLMAN, citizen of the United States, residing at Penryn, in the county of Placer and State of California, have invented certain new and useful Improvements in Plate or Pan Lifters, of which the following is a specification.

This invention comprehends certain new and useful improvements in kitchen utensils, and the invention has for its object a cheap, simple and efficient construction of plate or pan lifter which may be effectively used to engage and tightly grip either a round or rectangular plate or pan and remove the same from or place the same on a stove without danger of the operator being burned, and also without even the necessity of the operator getting uncomfortably near the heat, the length of the handle of the device and the construction of the parts rendering the lifter capable of being easily manipulated by merely grasping one end of the handle.

With these and other objects in view as will more fully appear as the description proceeds, the invention consists in certain construction, arrangement and combination of the parts that I shall hereinafter fully describe and claim.

For a full understanding of the invention reference is to be had to the following description and accompanying drawings, in which:—

Figure 1 is a perspective view of a plate or pan lifter constructed in accordance with my invention, the handle being broken away and not showing its complete length, and Fig. 2 is a transverse sectional view through the supporting frame of the device showing it in the operation of lifting a pan.

Corresponding and like parts are referred to in the following description and indicated in all the views of the drawing by the same reference characters.

Referring to the drawing, the numeral 1 designates a supporting framework of my plate or pan lifter, the same being of any desired substance or material, although preferably formed of relatively light and strong wire. The supporting framework 1, which is preferably oblong as shown, is pivotally connected at one end, as at 2, to a handle 3, intermediate of the ends of the latter. The handle 3 may be formed of wood or any other desired substance or material and may be of any desired length.

In the present embodiment of the invention, although it is to be understood that the invention is not limited in this respect, the supporting frame 1 is formed at two points intermediate the ends of each of its side members, with inwardly offset portions 4 upon which the suspending bails or clamps 5 are swung to move in a lateral direction toward or away from each other. In the present instance each of these clamps 5 is constructed of a single strip or length of wire embodying a preferably curved middle portion 6 coiled at its ends as indicated at 7 and thence extending upwardly to form the supporting arms 8, the wire being then again coiled around the inwardly offset portion 4 of the supporting frame 1 as indicated at 9, and the extremities 10 being turned inwardly toward the corresponding extremities of the opposite clamp and extending freely through or underneath keepers 11 that may be in the form of elongated staples, as shown.

From the foregoing description in connection with the accompanying drawing, it is believed that the operation of my improved plate or pan lifter is obvious. In the practical use of the device, the lower ends of the clamps 5 are slipped in an endwise direction underneath the rim or flange of the plate or pan, and it is manifest that as soon as the weight of the article to be suspended is imposed upon the clamps 5, the lower ends of the clamps will tend to move toward each other and tightly clamp the plate or pan between them, by and upon the tendency of the handle to rock about the point 2 as an axis, owing to its pivotal frame and the consequent upward pressure of the forward end of the handle upon the inwardly turned extremities 10 of the clamps. So long as the plate or pan is suspended in the clamps, it is clear that it will be tightly held thereby, but as soon as the article is deposited upon a table or the like, the upward pressure of the forward end of the handle 3 will be released from the inwardly turned ends 10 of the clamps and the device will be easily disengaged from the rear of the pan upon an endwise movement.

When the device is not in use, it is evident that it may be hung up out of the way on any suitable hook or the like by engaging the same with the loop end of the frame 1.

Having thus described the invention what is claimed as new is:—

1. A device of the character described comprising a supporting frame, a handle pivotally connected to the frame, and clamps carried by said frame and arranged to be moved toward each other by and upon the pivotal movement of the handle relative to the frame.

2. A device of the character described comprising a supporting frame, a handle pivotally connected thereto, and clamps carried by said frame and mounted to swing laterally thereon, said clamps being formed with inwardly turned ends extending over the handle.

3. A device of the character described comprising a supporting frame, a handle having pivotal connection with said frame, clamps carried by the frame and mounted thereon to swing laterally, the clamps being provided with inwardly turned ends extending across the handle, and a device carried by the handle for engaging the said ends of the clamps.

4. A device of the character described comprising a supporting frame, a handle having a movable connection therewith, and laterally swinging clamps carried by said frame and arranged to be moved toward each other by and upon the movement of the handle in one direction relative to the frame.

5. A device of the class described comprising a supporting frame formed with side members having inwardly projecting portions, a handle pivotally connected to said frame at one end of the latter, and clamps embodying supporting arms pivotally connected to the side members of the supporting frame at the inwardly offset ends thereof and inwardly turned ends extending across the handle.

In testimony whereof I affix my signature in presence of two witnesses.

STEPHEN A. HOLMAN. [L. S.]

Witnesses:
  JOHN VICTOR KAYS,
  JOHN EDWARD SCHUBERT.